(12) United States Patent
Ryan

(10) Patent No.: US 8,608,173 B2
(45) Date of Patent: Dec. 17, 2013

(54) METHOD AND APPARATUS TO PROVIDE SEALING CONTACT BETWEEN FIRST AND SECOND FUELDRAULIC COMPONENTS

(75) Inventor: Kevin M. Ryan, Cromwell, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 127 days.

(21) Appl. No.: 13/217,485

(22) Filed: Aug. 25, 2011

(65) Prior Publication Data

US 2013/0049301 A1    Feb. 28, 2013

(51) Int. Cl.
*F16J 15/08* (2006.01)
*F16J 15/14* (2006.01)
*F16J 15/06* (2006.01)

(52) U.S. Cl.
USPC ............................ 277/312; 277/316; 277/650

(58) Field of Classification Search
USPC ......... 277/567, 626, 627, 650, 652, 910, 312, 277/316
See application file for complete search history.

(56) References Cited

U.S. PATENT DOCUMENTS

| | | | | |
|---|---|---|---|---|
| 660,523 | A * | 10/1900 | Walker | 277/530 |
| 1,213,186 | A * | 1/1917 | Glauber | 285/199 |
| 1,460,154 | A * | 6/1923 | Frazier et al. | 285/98 |
| 1,501,481 | A * | 7/1924 | Frazier | 277/335 |
| 1,924,555 | A * | 8/1933 | Hubbard | 277/530 |
| 2,041,132 | A * | 5/1936 | Johnson | 285/112 |
| 2,258,135 | A * | 10/1941 | Curtis | 277/621 |
| 2,327,837 | A * | 8/1943 | Williams | 277/608 |
| 3,083,023 | A * | 3/1963 | Creavey | 277/647 |
| 3,094,337 | A * | 6/1963 | Pippert et al. | 277/638 |
| 3,147,015 | A * | 9/1964 | Hanback | 277/626 |
| 3,163,431 | A * | 12/1964 | Tanner | 277/381 |
| 3,253,835 | A * | 5/1966 | Brown | 277/322 |
| 3,290,047 | A * | 12/1966 | Mayer | 277/647 |
| 3,367,682 | A * | 2/1968 | Meriano | 285/106 |
| 3,430,990 | A * | 3/1969 | Nelson | 277/606 |
| 3,542,375 | A * | 11/1970 | Renwick | 277/646 |
| 3,602,532 | A * | 8/1971 | Ehrenberg | 285/364 |
| 3,815,926 | A * | 6/1974 | Vore | 277/583 |
| 3,909,010 | A * | 9/1975 | Swanson et al. | 277/314 |
| 4,239,242 | A | 12/1980 | Burns | |
| 4,712,285 | A * | 12/1987 | Morel et al. | 29/458 |
| 4,779,903 | A * | 10/1988 | Maier et al. | 285/336 |
| 5,065,493 | A * | 11/1991 | Ozora | 29/505 |
| 5,380,019 | A * | 1/1995 | Hillery et al. | 277/626 |
| 5,451,064 | A * | 9/1995 | Mercuri et al. | 277/625 |
| 5,454,573 | A * | 10/1995 | Nijland | 277/606 |
| 5,599,027 | A * | 2/1997 | Balsells | 277/642 |
| 5,806,857 | A * | 9/1998 | Mockenhaupt et al. | 277/595 |

(Continued)

FOREIGN PATENT DOCUMENTS

JP    09032928 A    2/1997

OTHER PUBLICATIONS

Examination Report GB1214901.9 mailed Nov. 28, 2012, 5 pages.

*Primary Examiner* — Vishal Patel
*Assistant Examiner* — L. Susmitha Koneru
(74) *Attorney, Agent, or Firm* — Cantor Colburn LLP

(57) ABSTRACT

According to one aspect, an apparatus to provide sealing contact between first and second fueldraulic components includes a metallic member, wherein the metallic member comprises a layer of metal that is formed into a spring energized seal member. The apparatus also includes a layer disposed on an outer portion of the metallic member to provide sealing contact between the first and second fueldraulic components.

3 Claims, 2 Drawing Sheets

(56) References Cited

U.S. PATENT DOCUMENTS

| | | | |
|---|---|---|---|
| 5,836,048 A * | 11/1998 | Rossman et al. | 16/2.2 |
| 6,030,531 A * | 2/2000 | Gershenson | 210/342 |
| 6,254,107 B1 * | 7/2001 | Neuhaus | 277/650 |
| 6,290,240 B1 * | 9/2001 | Knapp | 277/651 |
| 6,371,491 B1 * | 4/2002 | Schultz et al. | 277/627 |
| 6,402,159 B1 * | 6/2002 | Kohn | 277/608 |
| 6,497,416 B1 * | 12/2002 | Morvant | 277/602 |
| 6,499,745 B2 * | 12/2002 | Philipson | 277/650 |
| 6,631,910 B2 * | 10/2003 | Caplain et al. | 277/644 |
| 7,004,478 B2 * | 2/2006 | Spence et al. | 277/644 |
| 7,255,354 B2 * | 8/2007 | Tamura et al. | 277/650 |
| 7,700,229 B2 * | 4/2010 | Hamada et al. | 429/174 |
| 8,007,922 B2 * | 8/2011 | Mirchandani et al. | 428/548 |
| 8,146,924 B2 * | 4/2012 | Ohmi et al. | 277/650 |
| 8,251,373 B2 * | 8/2012 | Lev et al. | 277/647 |
| 2002/0153673 A1 * | 10/2002 | Caplain et al. | 277/626 |
| 2003/0102639 A1 * | 6/2003 | Kigawa et al. | 277/650 |
| 2005/0218606 A1 * | 10/2005 | Sakazaki et al. | 277/627 |
| 2005/0278941 A1 * | 12/2005 | Hamada et al. | 29/623.1 |
| 2006/0181032 A1 * | 8/2006 | Riggs et al. | 277/627 |
| 2008/0018058 A1 * | 1/2008 | Kobayashi et al. | 277/650 |
| 2008/0136122 A1 * | 6/2008 | Gambier | 277/650 |
| 2008/0309028 A1 | 12/2008 | Ohmi et al. | |
| 2009/0020962 A1 * | 1/2009 | Shinoda et al. | 277/650 |
| 2009/0026717 A1 * | 1/2009 | Tsuji | 277/650 |
| 2010/0239448 A1 * | 9/2010 | Okoroafor | 418/104 |
| 2012/0119448 A1 * | 5/2012 | Stewart et al. | 277/650 |
| 2012/0205877 A1 * | 8/2012 | Schumacher et al. | 277/600 |

* cited by examiner

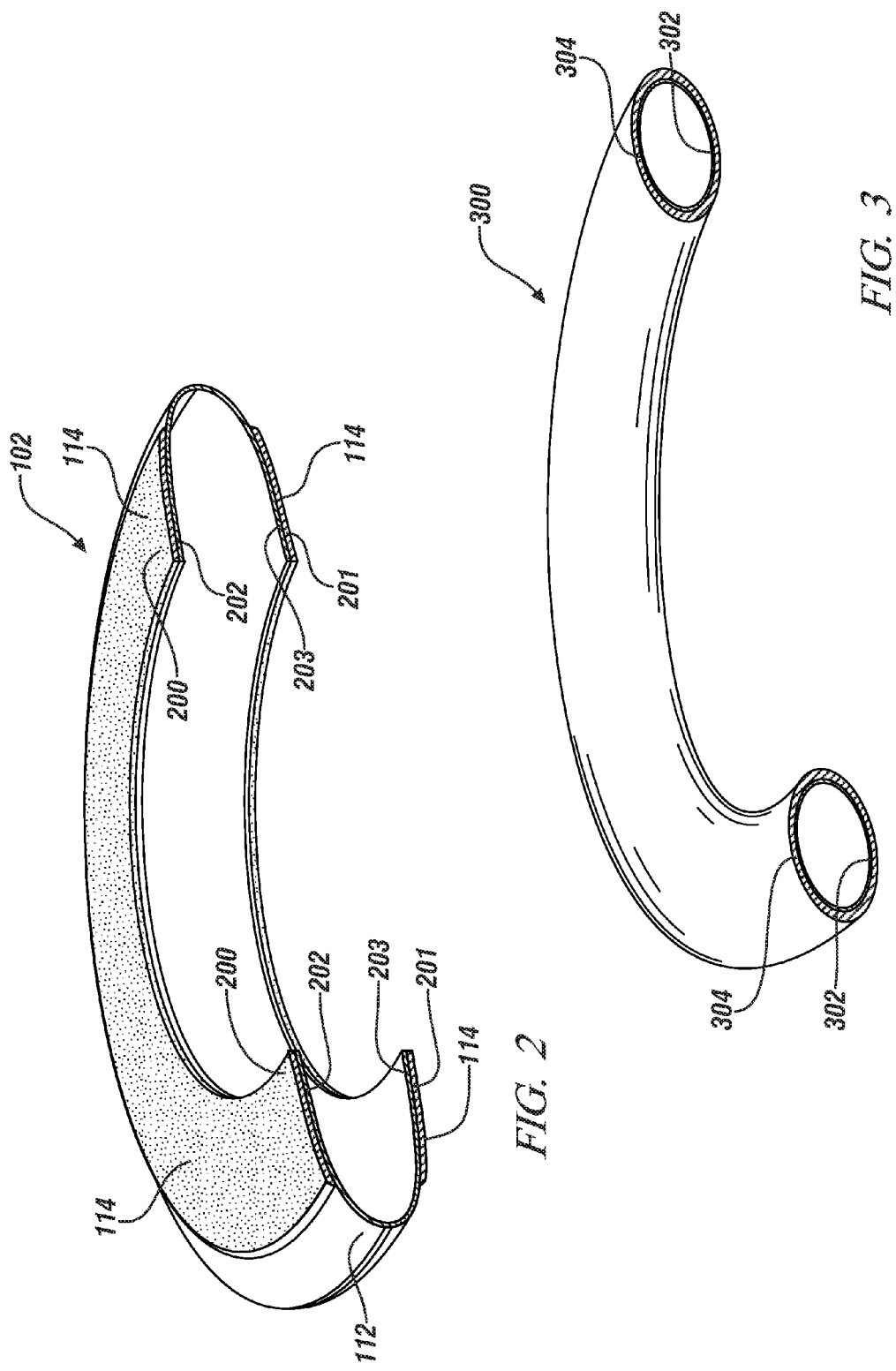

METHOD AND APPARATUS TO PROVIDE SEALING CONTACT BETWEEN FIRST AND SECOND FUELDRAULIC COMPONENTS

BACKGROUND OF THE INVENTION

The subject matter disclosed herein relates to sealing components and, more particularly, sealing fueldraulic aerospace components.

Fueldraulic components are hydraulic parts that utilize fuel as the working fluid for an application. Aerospace fueldraulic components may be exposed to extreme conditions, such as elevated temperatures, that may affect component operation or performance. In particular, fueldraulic components should be designed to withstand and operate during and after exposure to elevated temperatures, such as those associated with a fuel fire. Fire protection parts such as fire shields, fire blankets and intumescent fire paints may be added to components to help withstand fire exposure. In some cases, these fire protection parts add undesired weight, complexity, unwanted materials and cost to assemblies in aerospace applications.

BRIEF DESCRIPTION OF THE INVENTION

According to one aspect of the invention, an apparatus to provide sealing contact between first and second fueldraulic components includes a metallic member, wherein the metallic member comprises a layer of metal that is formed into a spring energized seal member. The apparatus also includes a layer disposed on an outer portion of the metallic member to provide sealing contact between the first and second fueldraulic components.

According to another aspect of the invention, a method for sealing fluid flow between first and second fueldraulic components includes placing a seal member in a gland of the first fueldraulic component and placing the second fueldraulic component on the first fueldraulic component, thereby compressing the seal member to form sealing contact with the first and second fueldraulic components, wherein the seal member comprises a layer of metal formed into spring energized metallic member and a polymeric layer disposed on an outer portion of the metallic member.

These and other advantages and features will become more apparent from the following description taken in conjunction with the drawings.

BRIEF DESCRIPTION OF THE DRAWING

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a sectional perspective view of an exemplary seal member; and

FIG. 3 is a sectional perspective view of another exemplary seal member.

Figure 1:
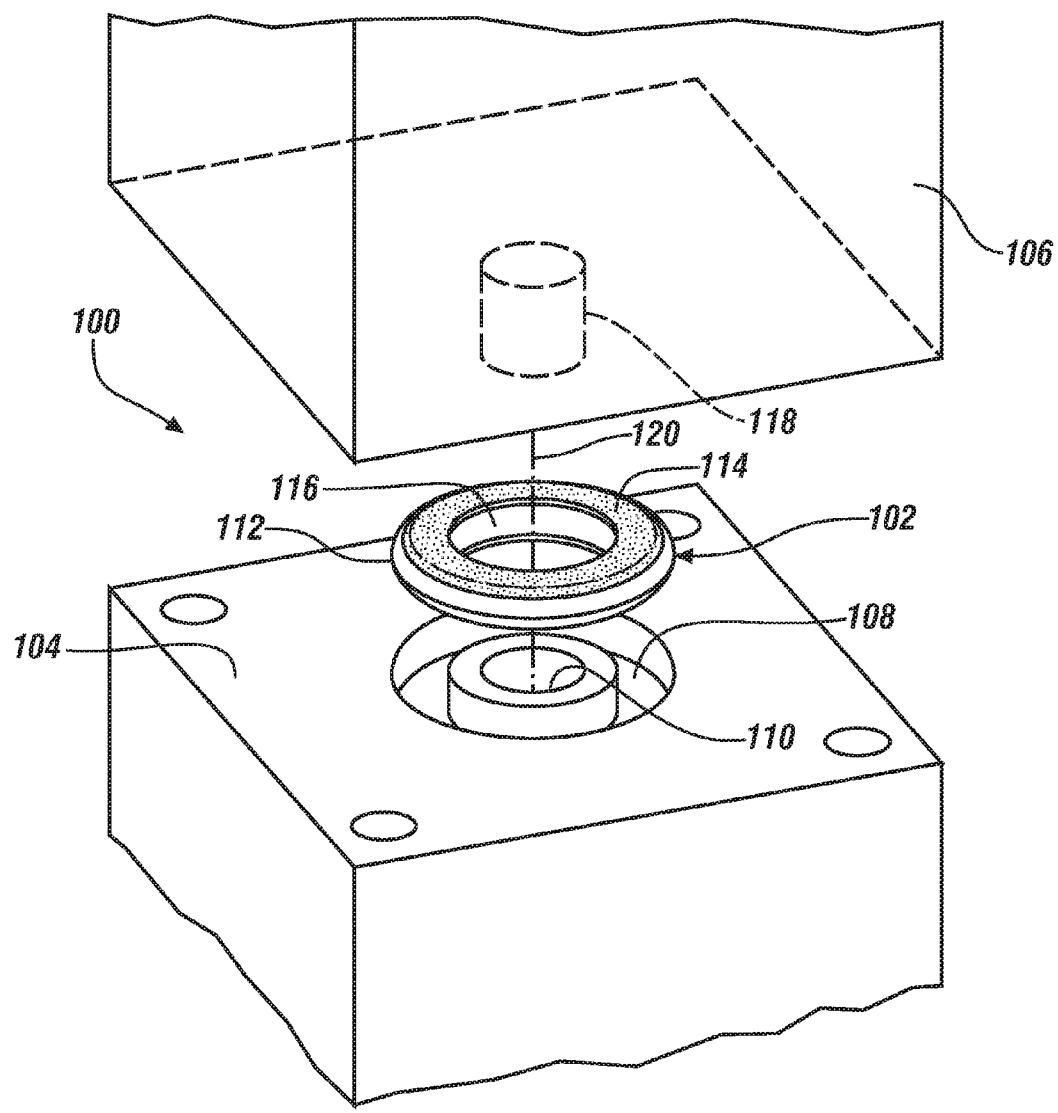
FIG. 1 is a perspective view of a portion of an exemplary fueldraulic assembly.

The detailed description explains embodiments of the invention, together with advantages and features, by way of example with reference to the drawings.

DETAILED DESCRIPTION OF THE INVENTION

FIG. 1 is a perspective view of a portion of an exemplary fueldraulic assembly 100. In the depicted example, the fueldraulic assembly 100 is part of a gas turbine engine system, such as a gas turbine for aerospace applications. Of course, the fueldraulic assembly 100 could be utilized in other turbine systems used for other applications. The illustrated fueldraulic assembly 100 includes a seal member 102 to be placed between a first fueldraulic component 104 and a second fueldraulic component 106. The first fueldraulic component 104 includes a gland 108 to receive at least a portion of the seal member 102, wherein the seal member 102 is configured to seal fluid flow (e.g., jet fuel) through a first passage 110 in the first fueldraulic component 104 into a second passage 118 in the second fueldraulic component 106. In an embodiment, the seal member 102 includes a metallic member 112 that is formed into a spring energized shape. The spring energized shape of the metallic member 112 may be any suitable geometry to provide sealing contact between components when compressed along an axis 120. As depicted, the seal member 102 is a ring or circular member that includes a passage 116 for flow of fluid between the first and second fueldraulic components 104, 106. The seal member 102 also includes a layer 114 disposed on an outer surface of the metallic member 112. In an embodiment, the layer 114 is a polymeric layer configured to flex and deform to provide sealing contact to surfaces of the first and second fueldraulic components 104, 106. Further, the layer 114 flexes as the metallic member 112 is axially compressed when placed between two components or parts. As depicted, the exemplary layer 114 is disposed on portions of the outer surface of the metallic member 112 that contact the components. In other embodiments, the layer 114 is disposed on substantially the entire outer surface of the metallic member 112. The metallic member 112 includes any suitable durable and strong metal alloy, such as stainless steel or a steel alloy. The seal member 102 is spring energized causing the seal member 102 to compress from an expanded shape when axially compressed and to expand back to the expanded shape when released.

As used herein, "downstream" and "upstream" are terms that indicate a direction relative to the flow of working fluid through the apparatus. As such, the term "downstream" refers to a direction that generally corresponds to the direction of the flow of working fluid, and the term "upstream" generally refers to the direction that is opposite of the direction of flow of working fluid. The term "radial" refers to movement or position perpendicular to an axis or center line. It may be useful to describe parts that are at differing radial positions with regard to an axis. In this case, if a first component resides closer to the axis than a second component, it may be stated herein that the first component is "radially inward" of the second component. If, on the other hand, the first component resides further from the axis than the second component, it may be stated herein that the first component is "radially outward" or "outboard" of the second component. The term "axial" refers to movement or position parallel to an axis. Further, the term "circumferential" refers to movement or position around an axis. In addition, the term "seal" refers to the action of or a part configured to join adjacent systems or mechanisms by reducing or preventing leakage of a fluid, containing pressure and/or excluding contamination.

FIG. 2 is a sectional perspective view of the seal member 102 show in FIG. 1. The seal member 102 includes the metallic member 112 formed into a spring energized shape. Spring energized shapes may be described as a shape that deforms when compressed (e.g., axially compressed) while still exerting a force that resists the compression and which, when the compressive force is released, returns to substantially the pre-compression shape. From time to time herein, a member that has a spring energized shape may be referred to as a spring energized member. The exemplary spring energized shape includes a C-shaped cross section. Other spring energized shapes may include a toroid (i.e., O-shaped cross section), U-shaped cross section, V-shaped cross section or other suitable geometry to provide the spring energized feature. A layer 114 is disposed on the outer surface of the metallic member to provide sealing contact to adjacent components. The exemplary layer 114 is disposed on outer surface of the metallic member 112, wherein the layer 114 on outer surface is configured to contact adjacent component surfaces. In an embodiment, a region 200 of the layer 114 provides sealing contact with the first fueldraulic component 104 while a region 201 of the layer 114 provides sealing contact with the second fueldraulic component 106. The depicted layer 114 is formed from a polymeric material. In other embodiments, the layer 114 is formed from any suitable conforming and durable material to reduce fluid flow across the layer 114 when in sealing contact with adjacent surfaces. The polymeric material of the layer 114 provides sealing contact with the fueldraulic components 104 and 106 for a selected temperature range. In a case when the seal member 102 is exposed to a fire and corresponding elevated temperatures, the polymer material of layer 114 melts or burns off. After the layer 114 is melted, a region 202 of the metallic member 112 provides sealing contact with the first fueldraulic component 104 while a region 203 of the metallic member 112 provides sealing contact with the second fueldraulic component 106.

Accordingly, the seal member 102 provides sealing contact via the layer 114 disposed on the metallic member during normal operation (i.e., operation without elevated temperatures and/or fires). In case of a fire or elevated temperatures that cause the layer 114 to melt and/or burn, the metallic member 112 of the seal member 102 provide sealing contact to adjacent surfaces of components. The sealing contact provided by the layer 114 may substantially restrict all or significant amount of fluid communication between the inner passage 116 and a region outside the seal member 102. In addition, sealing contact may also maintain a desired pressure differential across the seal member 102. In an embodiment, the metallic member 112 provides sealing contact with adjacent surfaces that restrict fluid communication between the inner passage 116 and a region outside the seal member 102. Further, in an example, the sealing contact provided by the metallic member 112 may be less restrictive than the sealing contact provided by the layer 114, due to deformation of the material of layer 114. In one embodiment, the layer 114 provides sealing contact to surfaces of adjacent components up to about 600 degrees Fahrenheit or 315 degrees Celsius (e.g., elevated temperatures associated with burning fuel). The layer 114 may enable sealing contact in temperatures ranging from about −65 to about 600 degrees F. or about −53 to about 315 degrees C. At temperatures greater than about 600 degrees F. (315 degrees C.), the layer 114 burns and the metallic member 112 provides sealing contact to surfaces of adjacent components, such as fueldraulic components 104 and 106. Therefore, the seal member 102 enables safe operation and durability for fueldraulic systems in elevated temperature environments.

FIG. 3 is a sectional perspective view of an exemplary seal member 300. The seal member 300 includes a metallic member 302 formed into a spring energized shape. The exemplary spring energized shape may be described as a toroid or as including an O-shaped cross section. A layer 304 is disposed on the entire outer surface of the metallic member 302 to provide sealing contact to adjacent components. In an embodiment, the layer 304 comprises a polymeric material that provides sealing contact with the fueldraulic components (e.g., 104, 106) for a selected temperature range. In a case when the seal member 300 is exposed to a fire and corresponding elevated temperatures, the polymer material of layer 304 melts and/or burns off the metallic member 302. After the layer 304 is burned or melted from the metallic member 302, the spring energized shape of the metallic member 302 provides sealing contact between fueldraulic components, thereby reducing fluid leaking across the seal member 300 to maintain pressure differentials and fluid flow.

The exemplary layer 114, 304 is formed from a suitable material, such as polymer and/or elastomer, which is adhered or bonded to the metallic member 112, 302. Examples of suitable organic polymers are thermoplastic polymers, thermosetting polymers, blends of thermoplastic polymers, blends of thermosetting polymers, and blends of thermoplastic polymers with thermosetting polymers. The organic polymer can be a homopolymer, a copolymer, a block copolymer, an alternating copolymer, an alternating block copolymer, a random copolymer, a random block copolymer, a graft copolymer, a star block copolymer, an ionomer, a dendrimer, or a combination comprising at least one of the foregoing polymers. An exemplary polymer for the member is a thermoplastic polymer.

Examples of thermoplastic polymers are polyacetals, polyolefins, polyacrylics, polycarbonates, polystyrenes, polyesters, polyamides, polyamideimides, polyarylates, polyarylsulfones, polyethersulfones, polyphenylene sulfides, polyvinyl chlorides, polysulfones, polyimides, polyetherimides, polytetrafluoroethylenes, polyetherketones, polyether etherketones, polyether ketone ketones, polybenzoxazoles, polyphthalides, polyacetals, polyanhydrides, polyvinyl ethers, polyvinyl thioethers, polyvinyl alcohols, polyvinyl ketones, polyvinyl halides, polyvinyl nitriles, polyvinyl esters, polysulfonates, polysulfides, polythioesters, polysulfones, polysulfonamides, polyureas, polyphosphazenes, polysilazanes, styrene acrylonitrile, acrylonitrile-butadiene-styrene (ABS), polyethylene terephthalate, polybutylene terephthalate, polyurethane, ethylene propylene diene rubber (EPR), polytetrafluoroethylene, fluorinated ethylene propylene, perfluoroalkoxyethylene, polychlorotrifluoroethylene, polyvinylidene fluoride, polysiloxanes, or the like, or a combination comprising at least one of the foregoing organic polymers.

Examples of thermosetting polymers suitable for use in the polymeric composition include epoxy polymers, unsaturated polyester polymers, polyimide polymers, bismaleimide polymers, bismaleimide triazine polymers, cyanate ester polymers, vinyl polymers, benzoxazine polymers, benzocyclobutene polymers, acrylics, alkyds, phenol-formaldehyde polymers, novolacs, resoles, melamine-formaldehyde polymers, urea-formaldehyde polymers, hydroxymethylfurans, isocyanates, diallyl phthalate, triallyl cyanurate, triallyl isocyanurate, unsaturated polyesterimides, or the like, or a combination comprising at least one of the foregoing thermosetting polymers.

Examples of blends of thermoplastic polymers include acrylonitrile-butadiene-styrene/nylon, polycarbonate/acrylonitrile-butadiene-styrene, acrylonitrile butadiene styrene/polyvinyl chloride, polyphenylene ether/polystyrene, polyphenylene ether/nylon, polysulfone/acrylonitrile-butadiene-styrene, polycarbonate/thermoplastic urethane, polycarbonate/polyethylene terephthalate, polycarbonate/polybutylene terephthalate, thermoplastic elastomer alloys, nylon/ elastomers, polyester/elastomers, polyethylene terephthalate/polybutylene terephthalate, acetal/elastomer, polyether etherketone/polyethersulfone, polyether etherketone/polyetherimide polyethylene/nylon, polyethylene/polyacetal, or the like.

Examples of suitable elastomers are polydimethylsiloxane, polybutadiene, polyisoprene, block copolymers, thermoplastic polyurethanes, copolyester-ethers (block copolymers derived from terephthalic acid, polytetramethylene glycol, and 1,4-butanediol), natural rubber, synthetic polyisoprene, butyl rubber, halogenated butyl rubbers, polybutadiene, nitrile rubber, hydrogenated nitrile rubbers, chloroprene rubber, polychloroprene, ethylene propylene rubber, and ethylene propylene diene rubber, epichlorohydrin rubber, polyacrylic rubber, silicone rubber, fluorosilicone rubber, fluoroelastomers, perfluoroelastomers, polyether-block-polyamides, chlorosulfonated polyethylene, ethylene-vinyl acetate, or the like, or a combination comprising at least on of the foregoing block elastomers. An exemplary elastomer is a polysiloxane mold.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A dual stage method for sealing fluid flow between first and second fueldraulic components, the method comprising:
    placing a seal member in a gland of the first fueldraulic component, wherein the seal member comprises a spring energized metallic member having a V-shaped cross section and top and bottom surfaces and including a polymeric layer disposed on each of the top and bottom surfaces, wherein the top and bottom surfaces become flat when a compressive force is applied perpendicularly on the surfaces; and
    placing the second fueldraulic component on the first fueldraulic component, thereby compressing the seal member between the first and second fueldraulic components;
    operating the seal member to provide sealing contact between the polymeric layers and the fueldraulic components during a first stage operating mode for temperatures up to about 600 degree Fahrenheit; and
    operating the seal member to provide sealing contact between the flat top and bottom surfaces and the fueldraulic components during a second stage operating mode for temperatures above 600 degree Fahrenheit when the polymeric layer melts away.

2. The method of claim 1, wherein the polymeric layer provides the sealing contact between the first and second fueldraulic components up to temperatures of about 600 degrees Fahrenheit.

3. The method of claim 2, wherein the metallic member provides the sealing contact between the first and second fueldraulic components at a temperatures greater than about 600 degrees Fahrenheit.

* * * * *